(12) United States Patent
Jang

(10) Patent No.: US 10,806,992 B2
(45) Date of Patent: Oct. 20, 2020

(54) GAME DEVICE

(71) Applicant: Chang Woo Jang, Jeonju-si (KR)

(72) Inventor: Chang Woo Jang, Jeonju-si (KR)

( * ) Notice: Subject to any disclaimer, the term of this patent is extended or adjusted under 35 U.S.C. 154(b) by 0 days.

(21) Appl. No.: 16/302,519

(22) PCT Filed: Nov. 29, 2017

(86) PCT No.: PCT/KR2017/013860
§ 371 (c)(1),
(2) Date: Nov. 16, 2018

(87) PCT Pub. No.: WO2018/147536
PCT Pub. Date: Aug. 16, 2018

(65) Prior Publication Data
US 2019/0201780 A1   Jul. 4, 2019

(30) Foreign Application Priority Data

Feb. 10, 2017 (KR) .................. 10-2017-0018459

(51) Int. Cl.
*A63F 3/04* (2006.01)
*G09B 19/22* (2006.01)
*A63F 3/00* (2006.01)

(52) U.S. Cl.
CPC ............ *A63F 3/04* (2013.01); *A63F 3/00094* (2013.01); *A63F 3/00214* (2013.01); *G09B 19/22* (2013.01); *A63F 2003/0022* (2013.01); *A63F 2003/00217* (2013.01); *A63F 2003/00223* (2013.01); *A63F 2003/00274* (2013.01); *A63F 2003/00406* (2013.01)

(58) Field of Classification Search
CPC ............... A63F 3/04; A63F 3/00214; A63F 2003/00223; A63F 2003/00217; A63F 2003/0022; G09B 19/22
USPC ...................... 273/236, 287, 241
See application file for complete search history.

(56) References Cited

U.S. PATENT DOCUMENTS 3,100,642 A * 8/1963 Goldstein ........... A63F 3/00895
206/579
3,165,318 A * 1/1965 Lissandrello ......... A63F 3/0423
273/272

(Continued)

FOREIGN PATENT DOCUMENTS

JP    2006-075344 A     3/2006
KR    10-2000-0053729 A  9/2000

(Continued)

*Primary Examiner* — Vishu K Mendiratta
(74) *Attorney, Agent, or Firm* — Novick, Kim & Lee, PLLC; Jae Youn Kim

(57) ABSTRACT

Provided is a game device which can be used for education, play or the like, in which, when three or more chips having the same colors or shapes are placed in a column by allowing a player to insert the chips having at least two types of colors or shapes into input holes (slots) formed at the upper parts of each column, a game is won. This device may have a shape enabling the game to be played by using one surface and at least two surfaces while rotating a body if necessary, and to a shape enabling the game to be played by further using an upper surface. This device can have a structure enabling a game to be played by placing the chips on the outer surfaces of a cube, and enabling various games to be played by allowing space division to be clarified.

2 Claims, 9 Drawing Sheets

(56) References Cited

U.S. PATENT DOCUMENTS

| | | | | |
|---|---|---|---|---|
| 3,840,236 | A | * | 10/1974 | Beskrone ............... A63F 3/0423 273/272 |
| 3,879,040 | A | * | 4/1975 | Smith .................. A63F 3/00094 273/241 |
| 3,930,651 | A | * | 1/1976 | Rader ................... A63F 9/0098 273/241 |
| 4,003,577 | A | * | 1/1977 | Bolach ................ A63F 3/00006 273/243 |
| 5,358,252 | A | * | 10/1994 | McPhaul ............. A63F 3/00214 273/241 |
| D365,123 | S | * | 12/1995 | Hall, III ....................... D21/336 |
| 5,613,681 | A | * | 3/1997 | Allen .................. A63F 3/00094 273/153 R |
| 5,857,673 | A | * | 1/1999 | Ablonczy ............... A63F 9/083 273/153 S |
| 6,276,685 | B1 | * | 8/2001 | Sterling .............. A63F 3/00214 273/236 |
| 6,513,808 | B2 | * | 2/2003 | Fang ....................... A63F 9/083 273/153 S |
| 6,533,277 | B1 | * | 3/2003 | Yin ......................... A63F 7/042 273/113 |
| D491,235 | S | * | 6/2004 | Fang ............................ D21/478 |
| D705,366 | S | * | 5/2014 | Inversin ....................... D21/478 |

FOREIGN PATENT DOCUMENTS

| | | |
|---|---|---|
| KR | 20-0250536 Y1 | 10/2001 |
| KR | 10-2004-0070523 A | 8/2004 |
| KR | 10-2011-0007996 A | 1/2011 |

* cited by examiner

GAME DEVICE

TECHNICAL FIELD

The present embodiment relates to a game device which can be used for education, play or the like, and more particularly, to a three or more chip-connecting game device which can be used for education or paying a game, in which when three or more chips having the same colors or shapes are placed in a column by allowing a player to insert the chips having at least two types of colors or shapes into input holes (slots) formed at the upper parts of each column, a game is won. The present embodiment relates to a shape enabling the game to be played by using one surface and at least two surfaces while rotating a body if necessary, and to a shape enabling the game to be played by further using an upper surface.

BACKGROUND ART

Board games may be one of play cultures handed down for the longest time in the history of mankind. A board game refers to a game which is played according to a certain rule while placing a chip or a card on a game plate. Traditional board games include go, chess, yut, etc.

Board games have significance not only as entertainment but also as a sound living culture. Thus, board games have been widely spread in advanced countries, such as, U.S. or Germany.

Board games are games which can be enjoyed by men and women of all ages, and are widely well-received due to merits of being playable even in a narrow space and easily learned by any player.

The board games have: 1) effects of improving ability to think such that high level of concentration, ability to think, and analyzing ability to predict counterparts are necessary for playing the games and thereby helps to improve ability of think; 2) educational value such that board games can help to escape from dependence on internet smart phone games, and help to develop sociality as well as creativity beyond simple games while associated with educational effects and therapy; 3) effects of developing brain such that brain cells are activated by repetitive thinking in order to improve intellectual ability; and 4) forming communication such that family and friends can communicate with each other via the board games.

In addition, there is a board game in which a go chip, which is a kind of chips, is placed using a go plate which is a flat surface in general, and when a predetermined number (at least three) of go chips are connected in a left-right or a diagonal direction, win or loss is determined. This game is played in a surface with an X-axis and a Y-axis, has less restriction in regulation and is simple, and thus, has a little variation and is simple. In addition, since only two people play a game, it is difficult to overcome an ability gap and may thus lose interest in the game according to a counterpart.

In addition, there is a board game which is named "Connect Four" in U.S. etc., and in which a chip is dropped from above and stacked from bottom, and when four chips with the same color are connected horizontally, vertically, and diagonally, a winner is determined. In this game, since only one surface is used, and the space in which the chip can be placed is as small as 7*6, a case in which win and loss are not determined occurs. Alternatively, defense and attack are made only with respect to a counterpart and thus, high level of thinking ability was not required.

DISCLOSURE OF THE INVENTION

Technical Problem

Embodiments provide a game device for education or play using a plurality of surfaces.

Embodiments provide a device for playing a game in which two players share or use at least one surface or two or more players share or use surfaces.

Embodiments provide a device enabling a game to be played in which one surface and at least two surfaces are used while rotating a body if necessary, and an upper surface is also used.

Embodiments provide a device enabling a game to be played in which chips stacked in a corner column of each surface are used also as chips of another neighboring surface.

Embodiments provide a device for playing a game in which a chip has a shape which can be directly placed on portions excluding edges of an upper surface and chips stacked in an upper portion (uppermost row) of each column of each surface are directly or indirectly connected to the chips placed on the upper surface.

Various problems to be addressed by the present invention are not limited to the aforesaid, but other problems not described herein will be clearly understood by those skilled in the art from descriptions below.

Technical Solution

A game device according to the present invention comprises: a first surface (30) among one or more surfaces each of which is provided with a slot (140) for inserting chips, which are tools for education or gaming, and which includes three or more columns (10) and three or more rows (20 (3*3); and a second surface (50) which share one column among the left end column (15) and right end column (16) of the first surface, is provided with a slot for inserting the chips, and includes three or more columns and three or more rows (3*3).

The present invention may further include at least one surface among: a third surface (40) which is provided opposite to the first surface (30), is provided with a slot for inserting chips, and includes three or more columns and three or more rows; and a fourth surface (40) which is provided opposite to the second surface (30), is provided with a slot for inserting the chips, and includes three or more columns and three or more rows.

In the present invention, each of the plurality of surfaces 30, 40, 50, and 60, which are provided with slots for inserting chips, may be formed to share at least one column among the respective left end columns (15) and the right end columns (16).

The present invention includes one surface provided with a slot for inserting chips which are tools for education or gaming, and including three or more columns and three or more rows; and another surface (75) provided at a position lower than the height of an uppermost row (70) of the one surface so that a chip is placed to be directly or indirectly connected to a chip stacked on the uppermost row of the one surface.

In addition, the present invention includes: one surface including three or more columns and three or more rows (3*3) in which chips, which are tools for education or gaming, are placed; and another surface which shares one column among a left end column and right end column of the one surface and includes three or more columns and three or more rows (3*3) in which the chips are placed.

According to the present invention, a device for education and gaming using multiple surfaces is provided, and when two players play a game with the device for a two or more player game, defense and attack are made only against a counterpart, and when three to five players pay a game, another player is induced to defense the counterpart instead of direct defense against the counterpart, and thus, strategic thinking ability and logical ability are required and combined thinking ability can be improved.

According to an embodiment, a game may be played such that one surface and at least two surfaces are used while rotating a body if necessary, and an upper surface is also used.

Embodiments may provide a device for playing a game in which chips stacked in a corner column of each surface are used also as chips for another neighboring surface.

According to an embodiment, education or a play game may be performed such that the chip may have a shape which can be placed on the upper surface, and the chips stacked on the uppermost row of each surface may be directly or indirectly connected to the chips placed on the upper surface An embodiment may provide a game, which can be played by anyone, but requires logical analyzing ability and strategic thinking for spatial analysis and predicting counterparts in order to obtain points, and may thus improve combined thinking ability.

According to an embodiment, a three dimensional space is used, so that spatial sensibility may be improved, and a game is played such that the columns of each surface are formed by sharing at least one column among the left end column and the right end column of each surface with each other, so that careful observation may be improved.

Embodiments may be enjoyed together with many players such as family or friends, so that sociality may be improved through fun and communication.

According to an embodiment, when three or more player play a game, a deliberate thinking ability and mutual interaction are required so that attack and defense are made through other counterparts, and thus may improve cooperation and combined thinking ability.

According to an embodiment, other surfaces should be observed while being rotated, and thus, memory and concentration may be improved.

In conventional five chips or connect4, a game can be played only once in a board late, but according an embodiment, even when one player connects the same color and obtains a point in a game, the game may be continued and a space for further obtaining a point is provided, and thus, endurance and concentration may be improved during a game.

It could be sufficiently understood that embodiments of the technical idea of the present invention may provide various effects that are not specifically described.

The present invention provides a device in which chips can be place on the outsides of three-dimensional surfaces, and a portion of an upper surface is closed such that spaces are clearly divided, and thus various play or games may be enjoyed.

MODE FOR CARRYING OUT THE INVENTION

Figure 1:
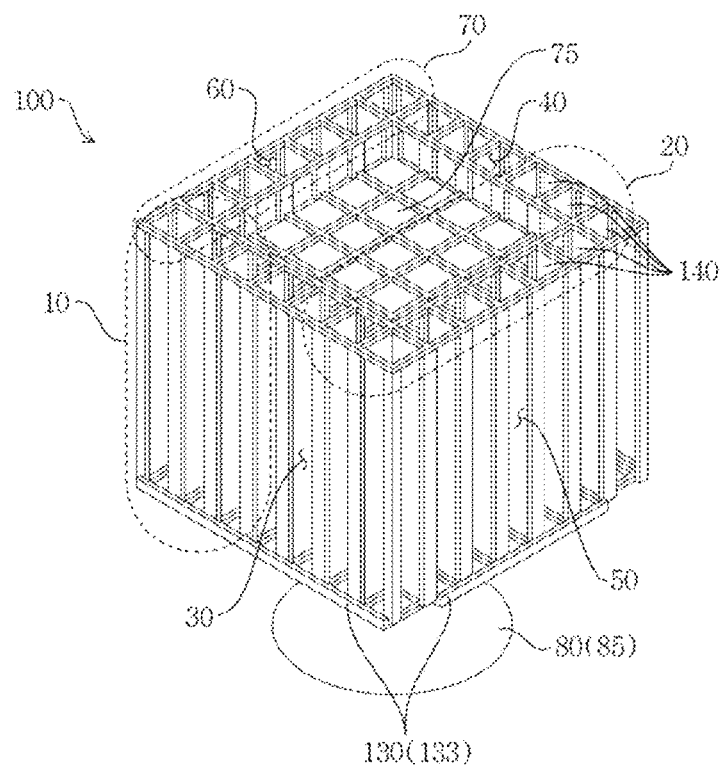
FIG. 1 is a fundamental perspective view illustrating a total shape according to an embodiment of the present invention.

Hereinafter exemplary embodiments of the present invention will be described in detail with reference to the accompanying drawings.

First, when reference numerals are assigned to the components in each of the drawings, it should be noted that the same components, although illustrated in different drawings, are allowed to have the same reference numerals if possible. Further, when the embodiments of the present invention are described, regarding substantially the same matters, the detailed description thereof will be omitted.

Further, when a component is described as "connected to", "coupled to" or "contacting" another component, the component may be directly connected or contact the another component, but a case in which a still another component is "connected", "coupled" or "contacts" between each of the components should also be understood as the same technical idea.

Further, when a component is described as being provided, formed or configured, the description should be interpreted as having substantially the same meaning, unless there is a specific definition thereof.

Also, in the present invention, the meaning of "comprise" is an open-type meaning that means "may further comprise other features".

It will be understood that although the terms such as first and second are used herein to describe various elements, these elements should not be limited by these terms. The terms are only used to distinguish one component from other components. For example, a first component referred to as a first component in one embodiment can be referred to as a second component in another embodiment.

The terms such as an upper end, a lower end, an upper surface and a lower surface or an upper portion and a lower portion are used to distinguish relative positions in a component. For example, when, for convenience, the upper side on a drawing is referred to as an upper portion/upper side, and the lower side on the drawing is referred to as a lower portion/lower side, the upper portion may be referred to as the lower portion and the lower portion may be referred to as the upper portion without departing from the scope of the present invention.

The terms used in the present invention will be interpreted as the same meanings even in a case in which another terms are used as follows.

Firstly, the term "chip" may be used by being replaced with the term "cube/dice/marble/checker", etc.

The term "slot" may be used by being replaced with the term "tower/checker catcher/frame, etc.

Technical idea of the present invention includes the following contents.

1) A structure in which surfaces different from each other are formed so as to share a corner or a portion.

2) A tower shape includes a triangular prism in case of three surfaces, a quadrangular prism in case of four surfaces, and a pentagonal prism in case of five surfaces.

3) The upper surface has a central portion having a level (a height at which the last dice or chip of neighboring surface can be placed) lower by one cell (one row) than the height of a peripheral slot. This central portion has the same height as the last chip stacked from a neighboring surface when a chip is correctly placed on the central portion, so that a large overall cube is formed. That is, such a structure provides five surfaces (in case of quadrangular prism) divided into a structure in which only outer walls of the large cube can be used to place chips, and thus, this means diversification of a game space.

The central portion of the upper surface is closed, and thus, the level lowered by one cell exhibits an effect in that the game space can be formed with multiple surfaces. Unless the central portion is closed, the game space is formed on one surface (a single surface). However, provided is a structure in which a portion of the central portion is closed, and the game space becomes five surfaces (in case of quadrangular prism).

Accordingly, in the above-mentioned structure, chips are stacked from bottom by a gravitational action in four side surfaces, and the central portion of the upper surface is closed and the chip can be correctly placed without being dropped down. In the process of inserting chips, the height of the lastly stacked chip from a neighboring surface and the height of the chips correctly placed on the upper surface become equal, and a single surface (one surface) is formed even in the upper surface and thus serves as a surface (one surface) for a game.

Hereinafter with reference to the accompanying drawings, preferred embodiments of a game device according to the present invention will be described in detail.

First, the present invention includes surfaces 30 composed of at least three columns 10 (vertical) and at least three rows 20 (horizontal), i.e., (3*3).

As shown in drawings of embodiments, in order to play a three or four chip-game with two or more surfaces of a three dimensional shape, a 7*7*7 cube is provided, and seven columns each provided with a rail (not shown) in each surface in order to guide and hold the chips.

In addition, a chip capture means, which can be opened/closed or inserted is provided in a lower portion of a column of each surface and is provided so as to prevent a chip from being dropped off, and the chip capture means may be opened, if necessary, to discharge the chips.

A structure, in which opening/closing and insertion into the lower portion is omitted and the lower portion of the rail is closed, is also possible.

In addition, in case of a structure in which chips can be place on the upper surface, that is, in case of 7*7 cells as in an embodiment of the present invention, and a game may be played such that (5*5) cells are formed and are directly or indirectly (closed state) connected to the chips placed on the uppermost rows formed on respective columns.

In addition, the present invention is provided with a rotating means (a hole and a rotating body) which can rotate a body (7*7*7) formed by each surface, each column, and each row respectively in the lower surface of the body and under the body.

Meanwhile, a game according to the present invention may be played until at least three to seven chips, which is the number of rails, are connected (in case of 7*7*7), and this is merely an embodiment and may be modified while not being limited thereto.

In addition, in another embodiment of the present invention, each row may also be provided in a grid shape (as in a lattice shape, a row is divided into cells so that the positions of the chips become clear).

Figure 2:
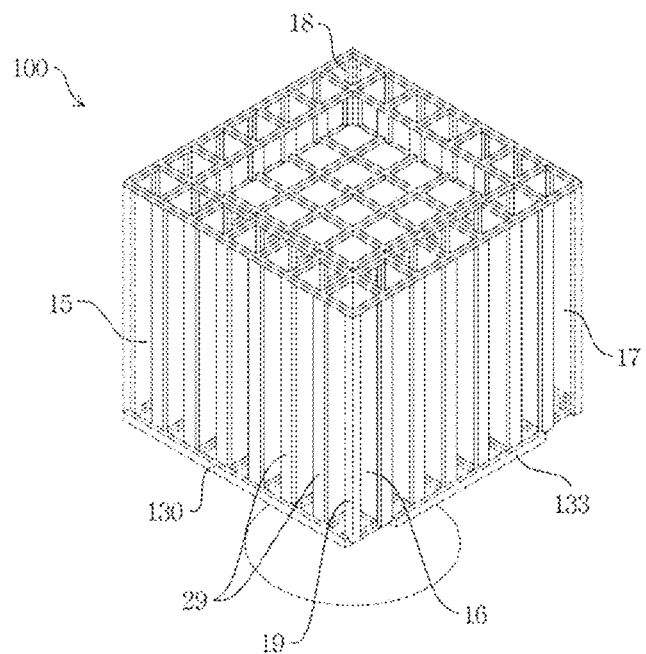
FIG. 2 is a perspective view illustrating a total shape according to an embodiment of the present invention, and illustrating that an outer supporter which holds chips in a left end column and a right end column among the columns may not be provided.
Figure 3:
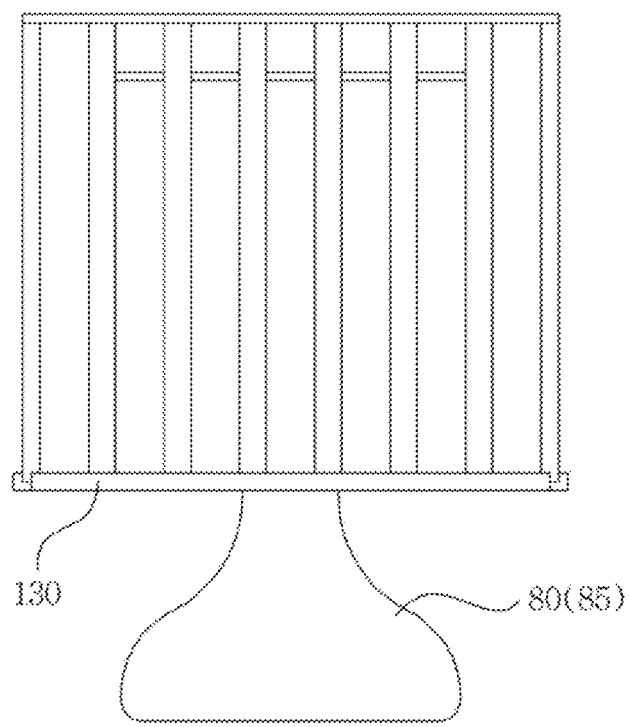
FIG. 3 is a view illustrating a front surface portion of an embodiment of the present invention in which a chip capture means is provided in a lower portion of a column.
Figure 4:
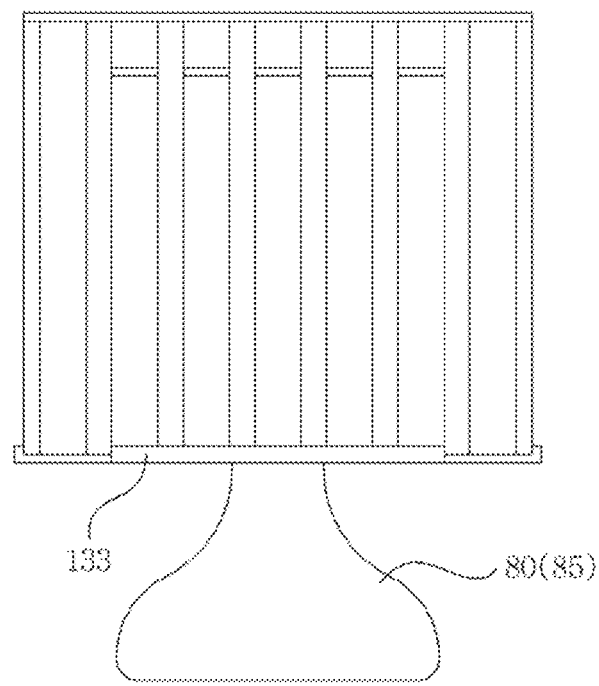
FIG. 4 is a view illustrating a left portion of an embodiment of the present invention in which a chip capture means is provided in a lower portion of a column.
Figure 5:
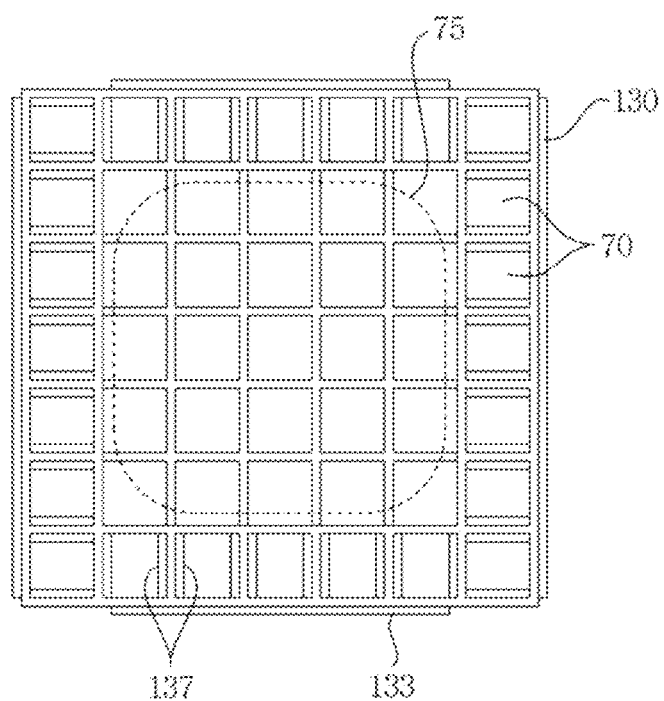
FIG. 5 illustrates a plan view of an embodiment of the present invention in which a chip can be placed on an upper surface of a body.
Figure 6:
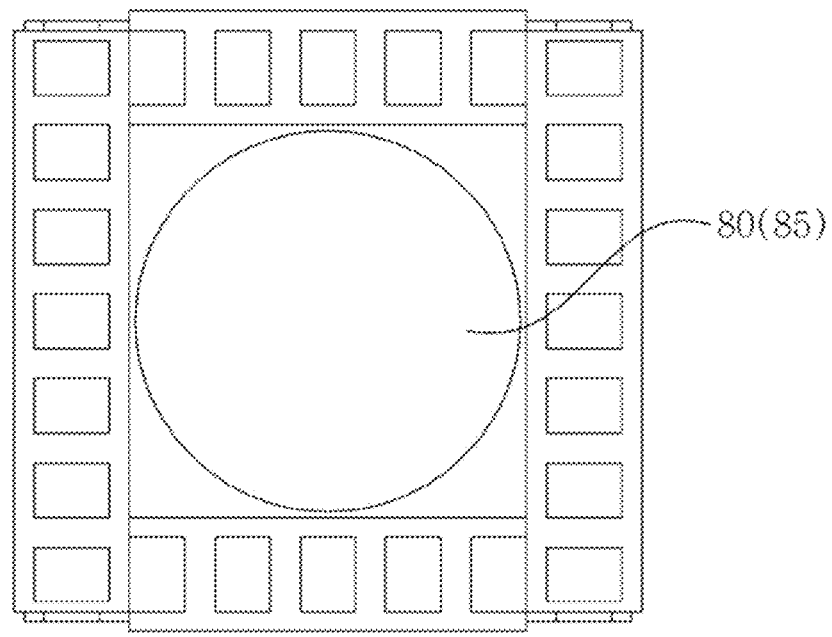
FIG. 6 illustrates a bottom view of an embodiment of the present invention in which a rotating means is provided.

FIG. 1 is a fundamental perspective view illustrating a total shape according to an embodiment of the present invention, FIG. 2 is another perspective view illustrating that a supporter 19 among supporters 29 and 19 of columns may not be provided, that is, an outer supporter 19 which holds chips in a left end column and a right end column may not be provided, FIG. 3 is a view illustrating a front surface portion of an embodiment of the present invention in which a chip capture means 130 is provided in a lower portion of a column, and FIG. 4 is a view illustrating a left portion of an embodiment of the present invention in which a chip capture means 133 is provided in a lower portion of a column, FIG. 5 illustrates a plan view of an embodiment of the present invention in which a chip can be placed on an upper surface 75 of a body, and FIG. 6 illustrates a bottom view of an embodiment of the present invention in which rotating means 80 and 85 are provided.

Figure 7:
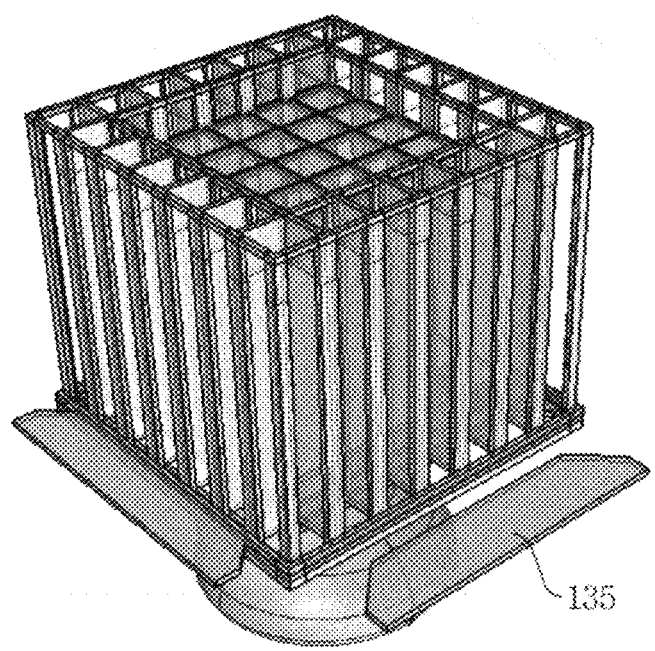
FIG. 7 is a view illustrating another embodiment of the present invention in which another chip capture means is provided.

FIG. 7 is a view illustrating another embodiment of the present invention in which another chip capture means 135 is provided.

Figure 8:
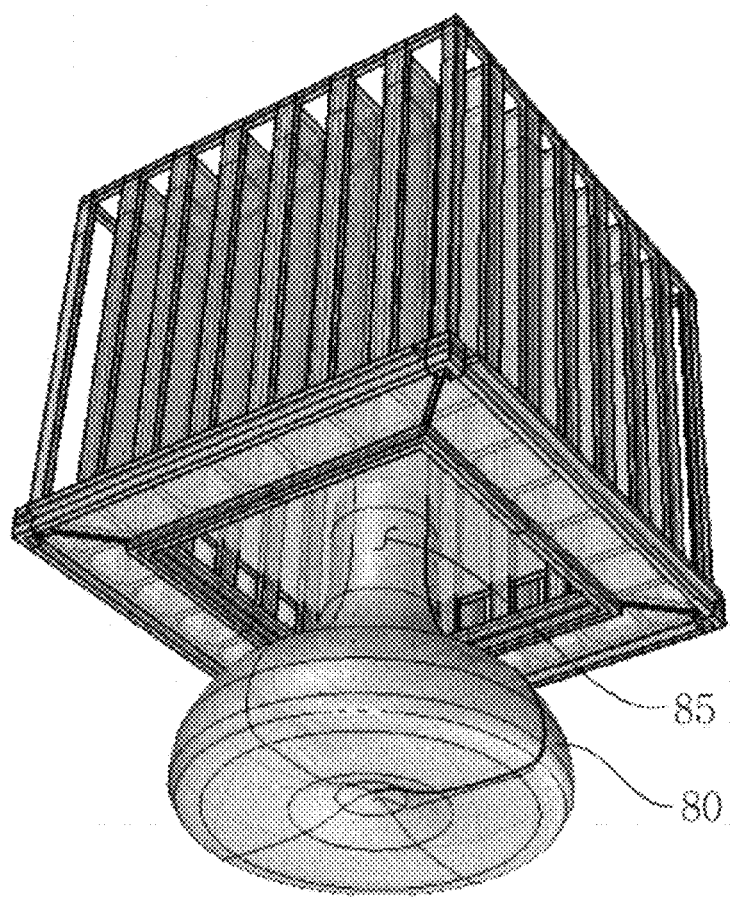
FIG. 8 is a view illustrating that a rotating means which can rotate a body in a lower side of a lower surface of the body in which a chip is inserted.
Figure 9:
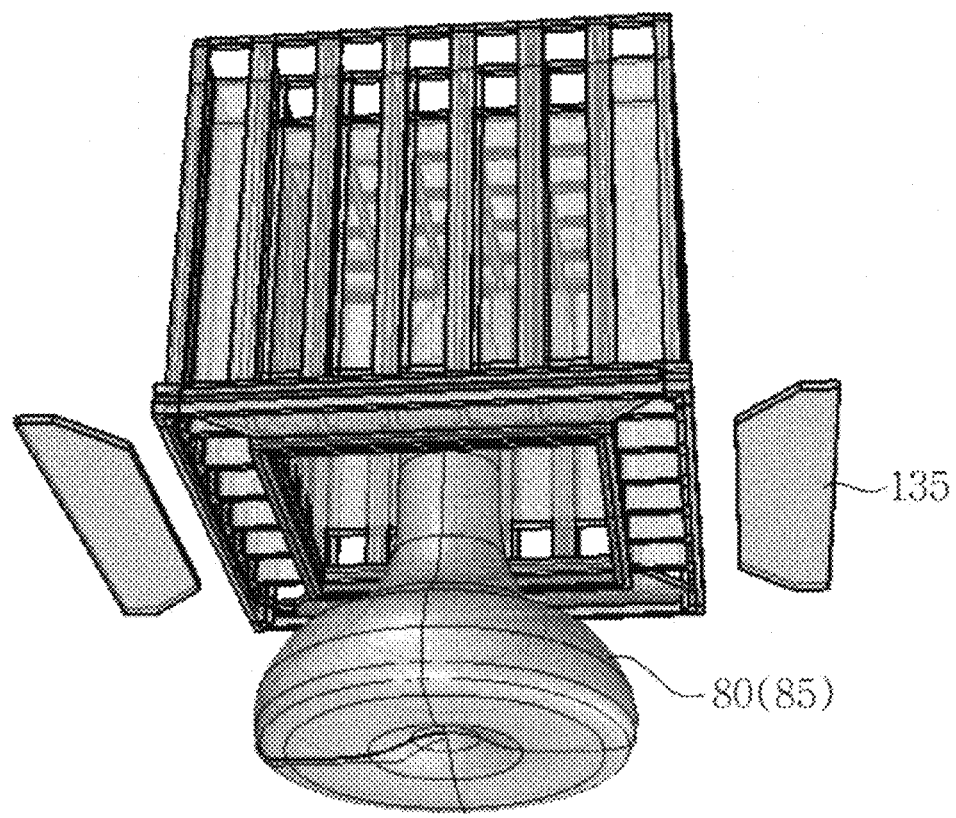
FIG. 9 is a view illustrating that a rotating means and a chip capture means are provided.
Figure 10:
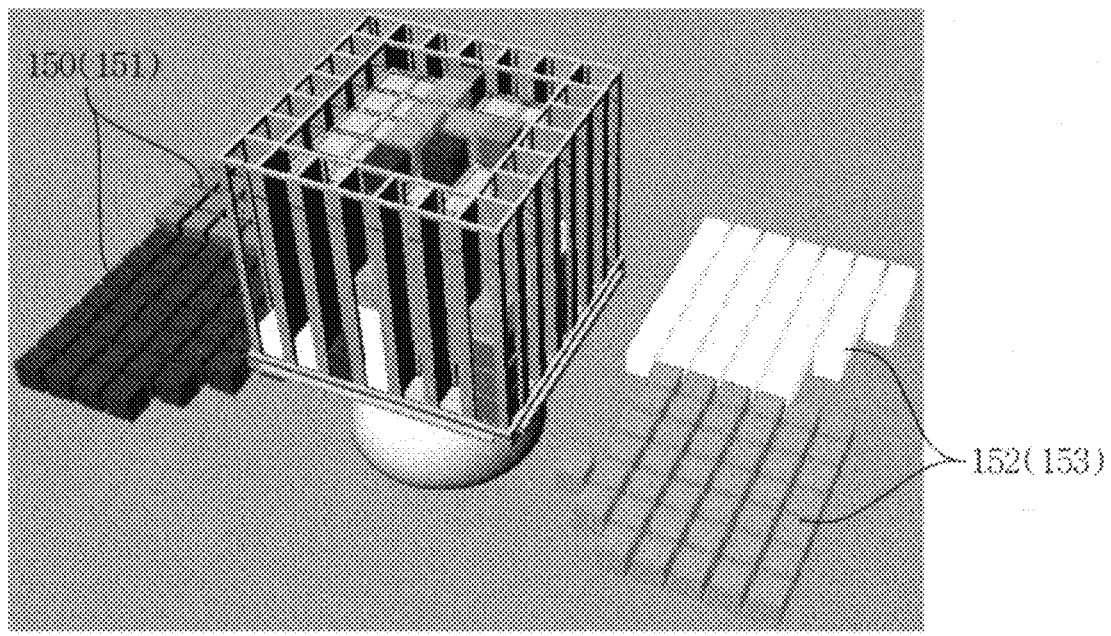
FIGS. 10 to 13 are views illustrating embodiments of a game device and chips used.
Figure 11:
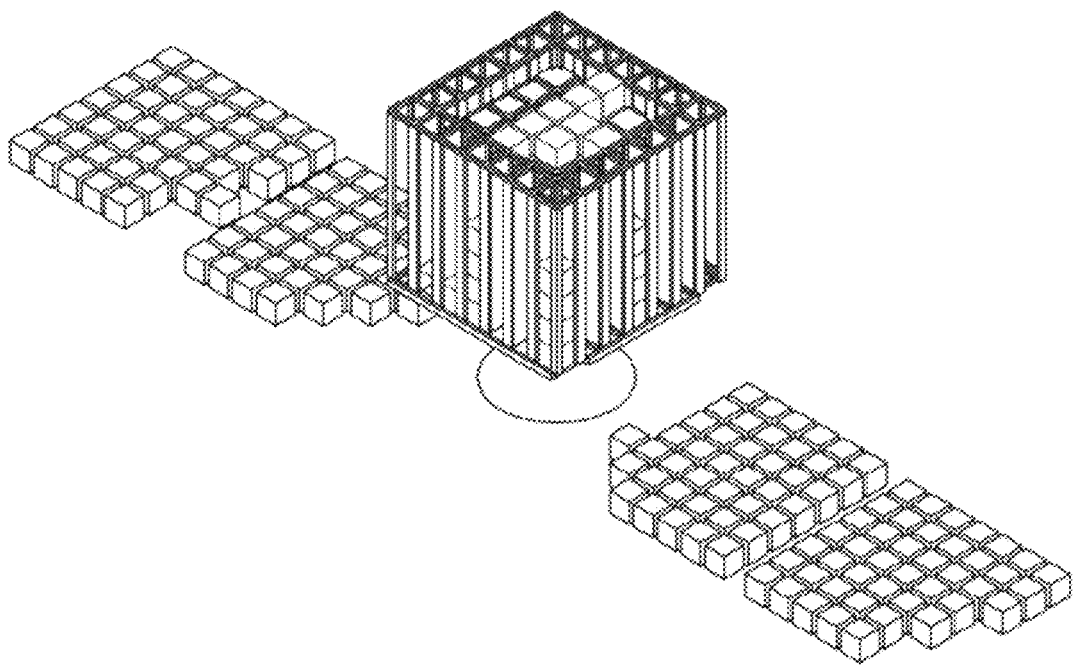
Figure 12:
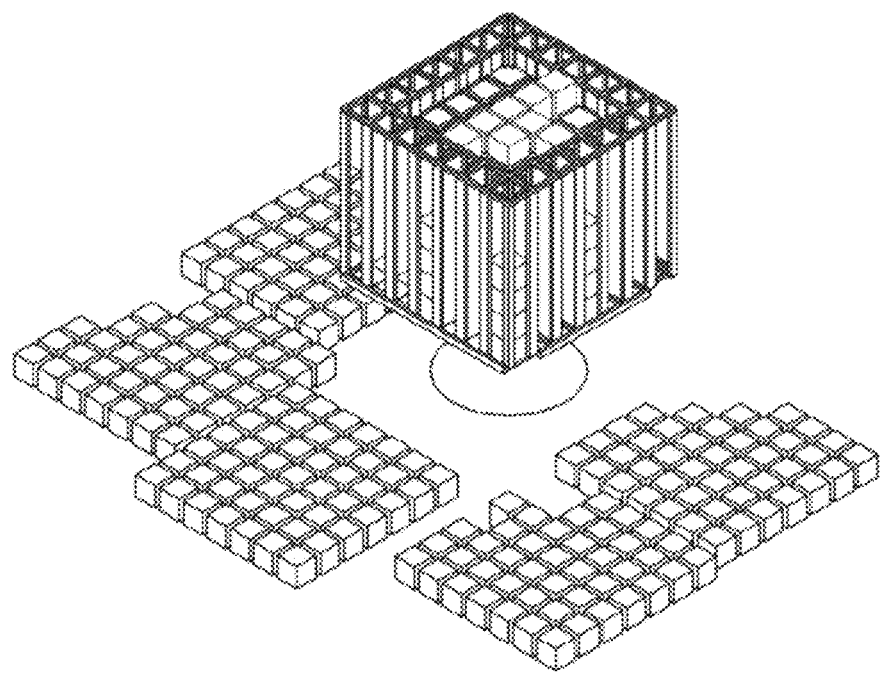
Figure 13:
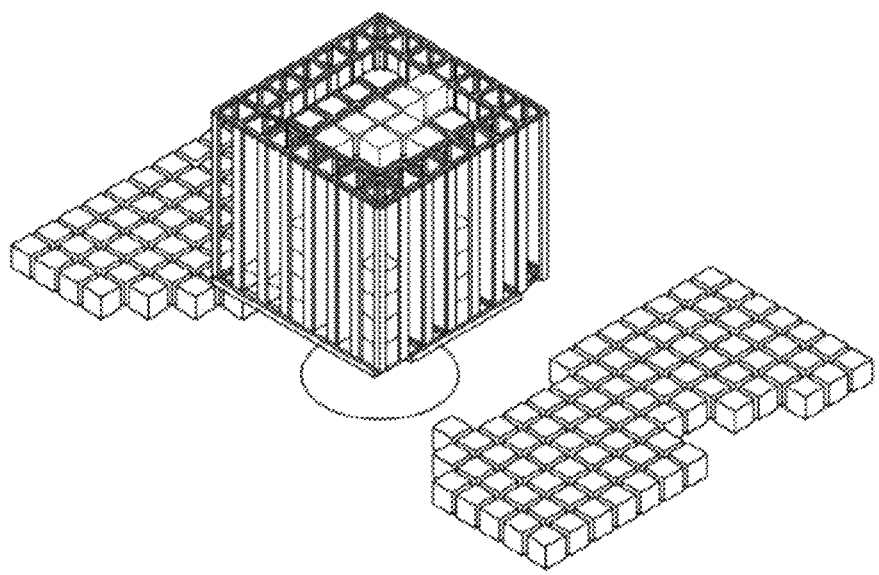

FIG. 8 is a view illustrating that a rotating means, which can rotate a body, is provided in a lower side of a lower surface of the body in which chips are inserted, and FIG. 9 is a view illustrating that a rotating means and a chip capture means are provided.

FIGS. 10 to 13 are views illustrating embodiments of a game device and chips used. The chips used in the present invention may have colors or shapes different from each other.

Figure 14:
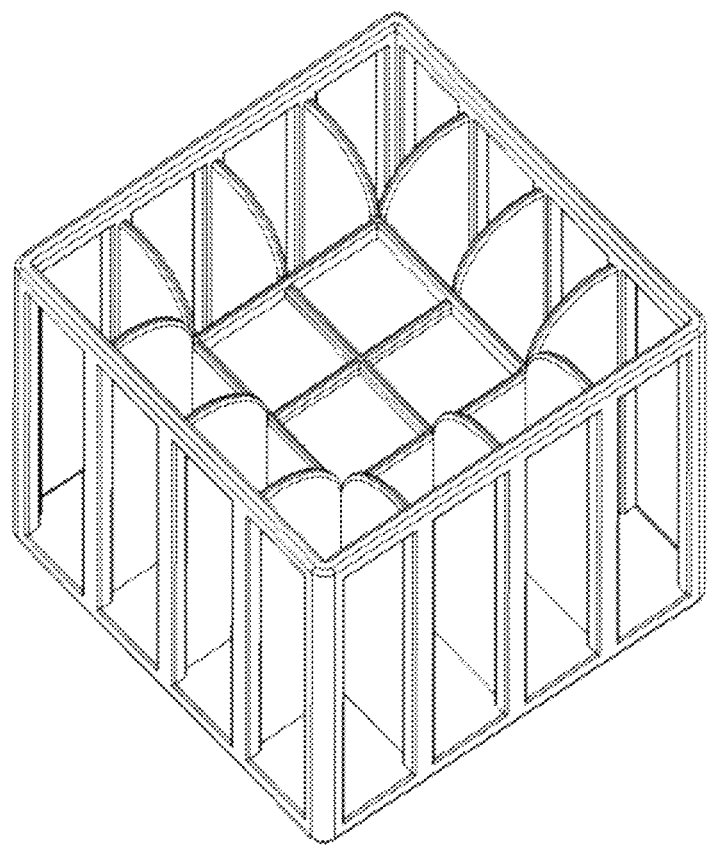
FIG. 14 is a view illustrating a game device of another embodiment.

FIG. 14 is a view illustrating a game device of another embodiment.

The actual shapes and forms are the same as the above-mentioned structure, but rounded-type slot portions in the upper surface may allow the chips to be more easily inserted.

With reference to drawings of embodiments of the present invention, the configuration, shape, and operation of the present invention will be described.

First, the rule of the game (education and play) according to an embodiment of the present invention varies according to determination of players, but is configured such that players respectively determine their colors or shapes and alternately place chips in a column or a row, and when three chips (three-chip), four chips (four-chip), five chips (five-chip), etc. which have the same color or shape are connected horizontally, vertically, or diagonally by a player on a single surface or surfaces connected to each other, the player obtains a point or wins the game.

As illustrated in each drawing, the game device includes: a first surface 30 among one or more surfaces each of which is provided with a slot 140 for inserting chips (with different colors or shapes), which are tools for education, learning or gaming, and which includes three (3*3) or more columns 10 and rows 20; and a second surface 50 which share one column among the left end column 15 and right end column 16 of the first surface, is provided with a slot for inserting chips, and includes at three or more columns and three or more rows (3*3).

In the present invention, the first surface and the second surface are merely example, and other surfaces may serve as the first surface or the second surface.

In other embodiments of the present invention, instead of inserting chips in a slot, the chips are provided with magnetic components to thereby be adhered, or a device according to the present invention is displayed on a screen of a computer or a terminal, and thus, the chips are inserted, attached, or clicked. Thus, these embodiments are also within the technical scope of the present invention.

In other words, a game device including: one surface including three or more columns and three or more rows (3*3) in which chips, which are tools for learning or gaming, can be placed using magnetic property thereof or displayed on a screen to be clicked; and another surface which shares one column among the left end column and the right end column of the one surface, and includes three or more columns and three or more rows (3*3), in which chips are placed by using the magnetic property thereof or displayer on the screen to be clicked, is also within the technical idea of the present invention, and the feature of this embodiment may be used by being combined with other features of the present invention.

The present invention includes a third surface 40 which is provided on the surface opposite to the first surface 30, is provided with a slot for inserting chips, and includes three or more columns and three or more rows.

In addition, the present invention includes a fourth surface 60 which is provided on the surface opposite to the second surface 30, is provided with a slot for inserting chips, and includes three or more columns and three or more rows.

The game is played such that columns of each of the plurality of surfaces 30, 40, 50, and 60, which are provided with slots for inserting chips, are formed to share at least one column among respective left end columns 15 and the right end columns 16.

In addition, an embodiment of the present invention includes: one surface which is provided with a slot for inserting chips, which are tools for learning or gaming, and includes three or more columns and three or more rows; and another surface 75 which is formed at a position (like a basin) lower than the height of the uppermost row 70, configured from the upper portion of each column of each surface such that a chip can be placed to be connected to a chip stacked on the uppermost row 70 directly (the uppermost row which is the upper portion of a column is opened and connected to the upper surface) or indirectly (although the uppermost row which is the upper portion of a column is not opened to the upper surface but is considered as connected to the upper surface).

In addition, an embodiment of the present invention includes: a first surface 30 which is provided with a slot for inserting chips, which are tools for education, learning or gaming, and includes three or more columns and three or more rows; and a second surface 50 which shares one column among a left end column 15 and a right end column 16 of the first surface, is provided with a slot for inserting chips, and includes three or more columns and three or more rows (3*3); and an upper surface 75 which is formed at a position lower than the height of the uppermost row, which is an upper portion of each column of the one surface such that a chip can be placed to be directly or indirectly connected to a chip stacked on the uppermost row of at least one surface among the first surface and the second surface.

Meanwhile, chip capture means 130, 133 and 135, which allow the chips inserted through slots respectively provided to columns to be stacked or extracted, are provided in lower portions of columns of each surface. Here, the chip capture means is merely an example, and other shapes or forms may also be possible.

As illustrated in FIG. 5, the chip capture means 130 and 133 have trapezoidal shapes to be inserted into lower portions of columns, and are provided with wing-like extension parts 137 in respective sides of the trapezoids so as to engage with the chips. Meanwhile, a structure in which the capture means may be omitted and which has a closed bottom may be possible.

The chips inserted through the slots 140 provided to respective columns may have different colors or shapes from each other, but embodiments are not limited thereto, and other chips may be used as long as players can be distinguished thereby.

In addition, in order to make it possible to play a game even while rotating the game device, an embodiment of the present invention is provided with rotating means 80 and 85 on the lower surface/lower side of the body so that the body can be rotated. Although a hole 85 is not shown in the drawings, the hole is favorably provided in the lower surface of the body. Meanwhile, although the hole is not provided, the body may also be provided in another form that can be rotated, and this is also within the technical idea of the present invention.

As described above, the present invention relates to a game device which can be used for education, play or the like, and to a three or more chip-connecting game device which can be used for education or paying a game, in which when three or more chips having the same colors or shapes are placed in a row by allowing a player to insert the chips having at least two types of colors or shapes input holes (slots) formed at the upper parts of each row, a game is won. In addition, the present invention relates to a shape enabling the game to be played by using one surface and at least two surfaces while rotating a body if necessary, and to a shape enabling the game to be played by further using an upper surface.

The above-disclosed subject matter is to be considered illustrative, and not restrictive, and the appended claims are intended to cover all such modifications, enhancements, and other embodiments, which fall within the true spirit and scope of the present disclosure. Accordingly, the embodiments disclosed in the present invention are not to limit the technical idea of the present invention but to explain the invention, and the technical scope of the present invention is not limited by the embodiments. Therefore, the scope of the invention is defined not by the detailed description of the invention but by the appended claims, and all differences within the scope will be construed as being included in the present disclosure.

INDUSTRIAL APPLICABILITY

The present invention can be used as a tool for gaming and/or learning.

The invention claimed is:

1. A game device comprising:

a left row of elongated-hollowed columns, each of which for receiving a plurality of chips in a stacked manner;

a right row of elongated-hollowed columns, each of which for receiving a plurality of chips in the stacked manner, the right row of elongated-hollowed columns is spaced apart from the left row of elongated-hollowed columns;

a front row of elongated-hollowed columns, each of which for receiving a plurality of chips in the stacked manner, wherein the front row connects a front one of the left row of elongated-hollowed columns with a front one of the right row of elongated-hollowed columns; and a back row of elongated-hollowed columns, each of which for receiving a plurality of chips in the stacked manner, wherein the back row connects a rear one of the left row of elongated-hollowed columns with a rear one of the right row of elongated-hollowed columns, wherein each of the left, right, front and back rows of plurality of elongated-hollowed columns has a slot located at an upper end thereof for receiving the plurality of chips, wherein the game device further comprises a plurality of upper surfaces positioned lower than the slots and positioned inside the left, right, front and back rows of elongated-hollowed columns, for placing chips thereon, such that the chips placed on the plurality of upper surfaces can be adjacent to a respective upper most chip of the plurality of chips stacked in one of the left, right, front and back rows of elongated-hollowed columns, wherein the plurality of upper surfaces are disposed at a central upper portion of the game device, are arranged in a grid shape being separated from each other, and are positioned lower than the slots by one horizontal row which is a height of each of the chips, wherein the central upper portion is closed, and thus, the plurality of upper surfaces are closed, such that the chips placed on the plurality of surfaces are at a same level as the upper most chips stacked in the left, right, front and back rows of elongated-hollowed columns.

2. The game device of claim 1, further comprising a plate for closing or opening at least one bottom opening of the elongated-hollowed columns to capture or extract the plurality of chips contained therein.

* * * * *